United States Patent [19]

Morrow

[11] 4,183,709
[45] Jan. 15, 1980

[54] PICK UP TRUCK AND WRECKER ASSEMBLY

[75] Inventor: Dennis W. Morrow, Grosse Pointe Park, Mich.

[73] Assignee: Eagle Industries, Inc., Dearborn, Mich.

[21] Appl. No.: 853,317

[22] Filed: Nov. 21, 1977

[51] Int. Cl.² .............................................. B60P 3/12
[52] U.S. Cl. ........................................ 414/563; 212/9
[58] Field of Search .............. 214/77 R, 77 P, 75 H, 214/86 A, 501; 212/8 R, 9; 414/563, 542, 543

[56] References Cited

U.S. PATENT DOCUMENTS

| | | | |
|---|---|---|---|
| 1,925,296 | 9/1933 | Barrett | 214/501 |
| 2,852,148 | 9/1958 | Jones | 214/77 R |
| 3,145,857 | 8/1964 | Hayman et al. | 214/86 A |
| 3,539,062 | 11/1970 | Allen | 214/86 A |
| 3,620,393 | 11/1971 | Bubik | 214/86 A |
| 3,716,152 | 2/1973 | Sloter | 214/86 A |
| 3,888,368 | 6/1975 | Hawkins | 214/86 A |
| 4,034,873 | 7/1977 | Haring | 214/86 A |
| 4,044,900 | 8/1977 | Gaumont et al. | 214/86 A |

Primary Examiner—Lawrence J. Oresky
Attorney, Agent, or Firm—Cullen, Sloman, Cantor, Grauer, Scott, & Rutherford

[57] ABSTRACT

A wrecker assembly is combined with a pick up truck or cab and chassis having a frame, a rear axle, a cab and/or a floor, side walls, and a battery. The wrecker assembly comprises a sub-frame assembly mounted upon the floor or frame and is secured to the frame. The boom including a pair of forwardly diverging side plate ends is pivotally mounted upon the sub-frame adjacent the cab. A tower mounting plate spans the boom side plates and projects thereabove. A hydraulic power cylinder including a reciprocal piston rod is pivotally mounted upon the sub-frame assembly with the end of the piston rod pivotally connected to the tower plate at its upper end. A power pack including a motor, pump, valve and a fluid reservoir is mounted upon the boom and a pair of flexible conduits respectively interconnect the pump valve and opposite ends of the cylinder. An electrical circuit includes a manual "forward and reverse" switch interconnecting the battery with the motor and valve for selective raising and lowering of the boom.

4 Claims, 3 Drawing Figures

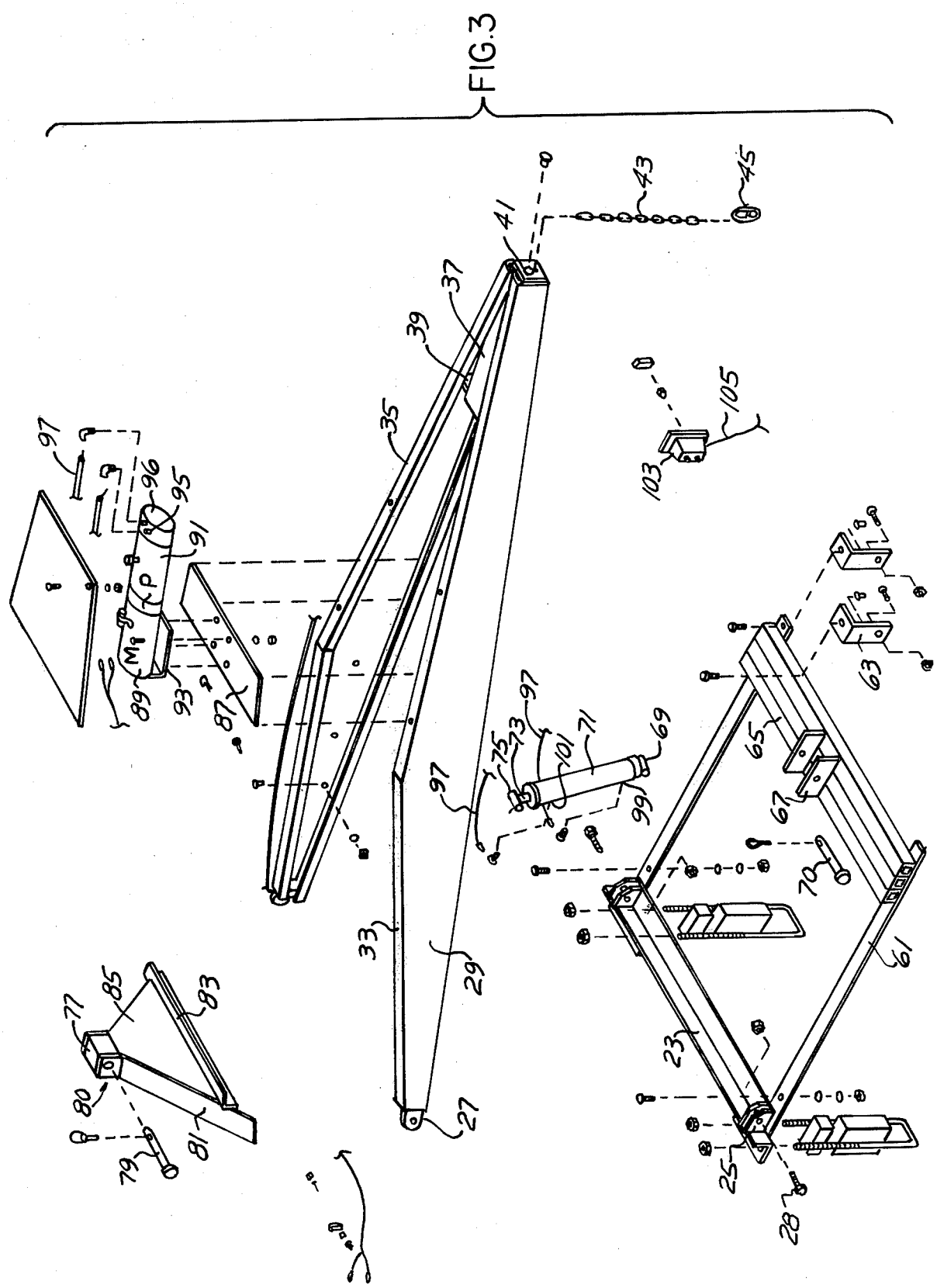

PICK UP TRUCK AND WRECKER ASSEMBLY

BACKGROUND OF THE INVENTION

Heretofore, in conventional wreckers, there is employed for raising and lowering of the boom; cables, sheaves, a power take off, a drive line, universal joints and a winch, all necessary for the effective raising and lowering of the boom and for lifting and towing a load such as a disabled vehicle. Often times, with the boom in its raised position, it extends above the top of the cab, making it difficult for the wrecker assembly to enter confined areas.

Heretofore, most wrecker constructions are particularly designed and manufactured in that configuration, as their primary mechanism.

BRIEF DESCRIPTION OF THE INVENTION

It is an object of the present invention to provide an improved wrecker assembly which forms the part of a kit and which may be adapted to the conventional pick up truck on cab and chassis for conversion into a wrecker assembly.

The combination pick up truck or cab and chassis and wrecker assembly eliminates the need for a cable, sheaves, power take off, drive line and universal joints and a winch. Instead of all this mechanism, there is merely provided a hydraulic cylinder and piston rod assembly which, at one end, is pivotally mounted upon the truck floor and secured to the frame and with the free end of the piston rod pivotally conneted to the boom at a point intermediate its ends for effecting under control the raising and lowering of the boom with power in both directions. A power pack is mounted upon and within the boom and includes a motor, pump, reservoir and valve assembly, and an electrical circuit with a 12-volt battery and a manual "forward and reverse" switch and incorporating a pair of flexible conduits between the valve outlets and the respective ends of the cylinder in a very compact assembly. A sub-frame is provided which is mounted upon the floor of the pick up truck or frame of the cab and chassis and which provides the pivotal mounting for the boom as well as the pivotal mounting for the hydraulic cylinder. The mounting of the hydraulic cylinder is located forwardly of the rear axle and so arranged that with its rod fully extended and the boom in its highest position it is, nevertheless, below the top of the pick up cab.

These and other objects and constructions will be seen from the following specification and claims in conjunction with the appended drawings.

THE DRAWINGS

FIG. 3 is a perspective exploded view of the sub-frame, the boom power cylinder and power pack assembly.

DETAILED DESCRIPTION OF THE INVENTION

Figure 2:
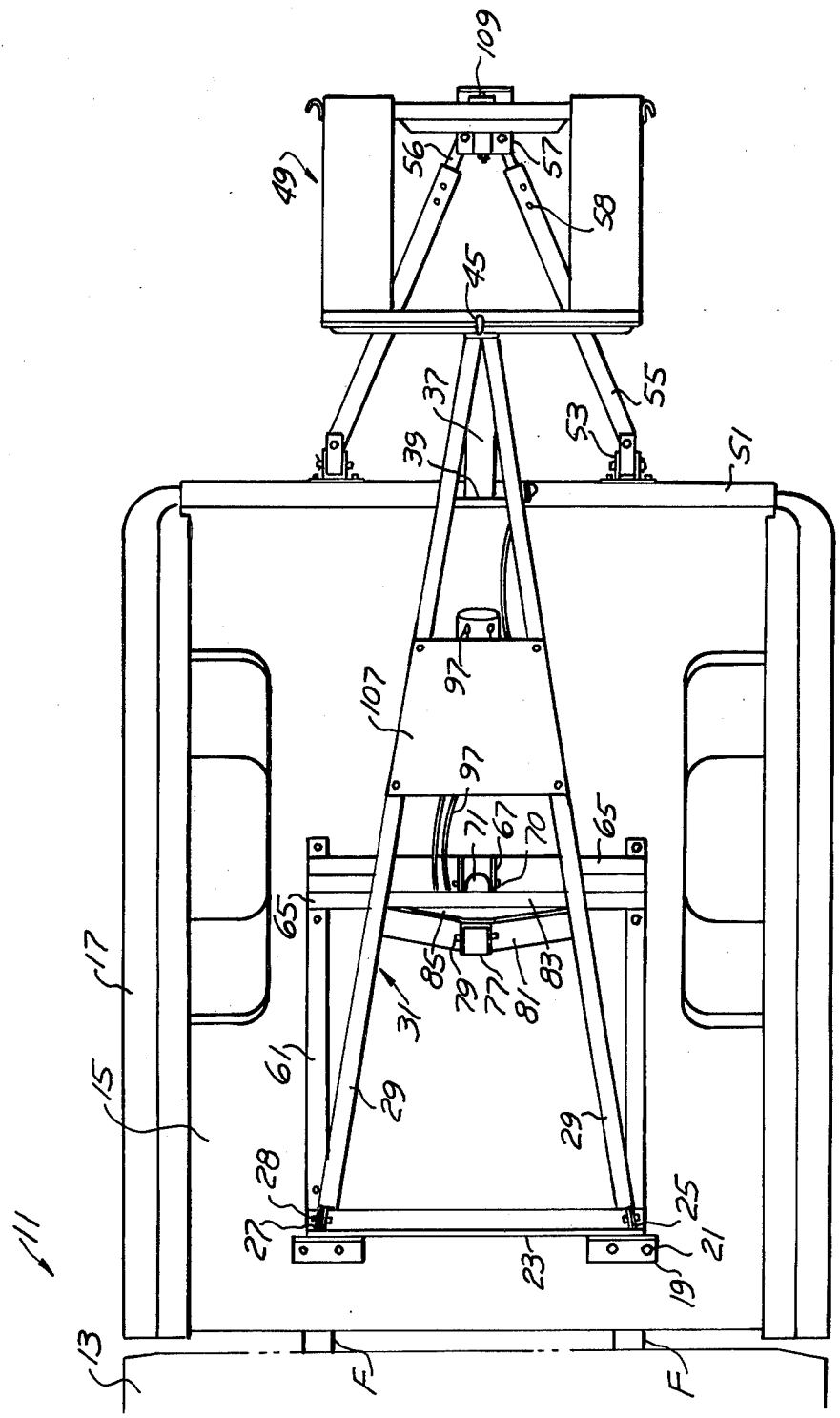
FIG. 2 is a fragmentary plan view thereof.

Referring to the drawings, a combination pick up truck and wrecker is generally indicated at 11, FIG. 2, and includes a cab 13, fragmentarily shown, a conventional frame F, a floor or deck 15, sides 17 and a conventional vehicle 12-volt battery, not shown in the drawing.

Figure 1:
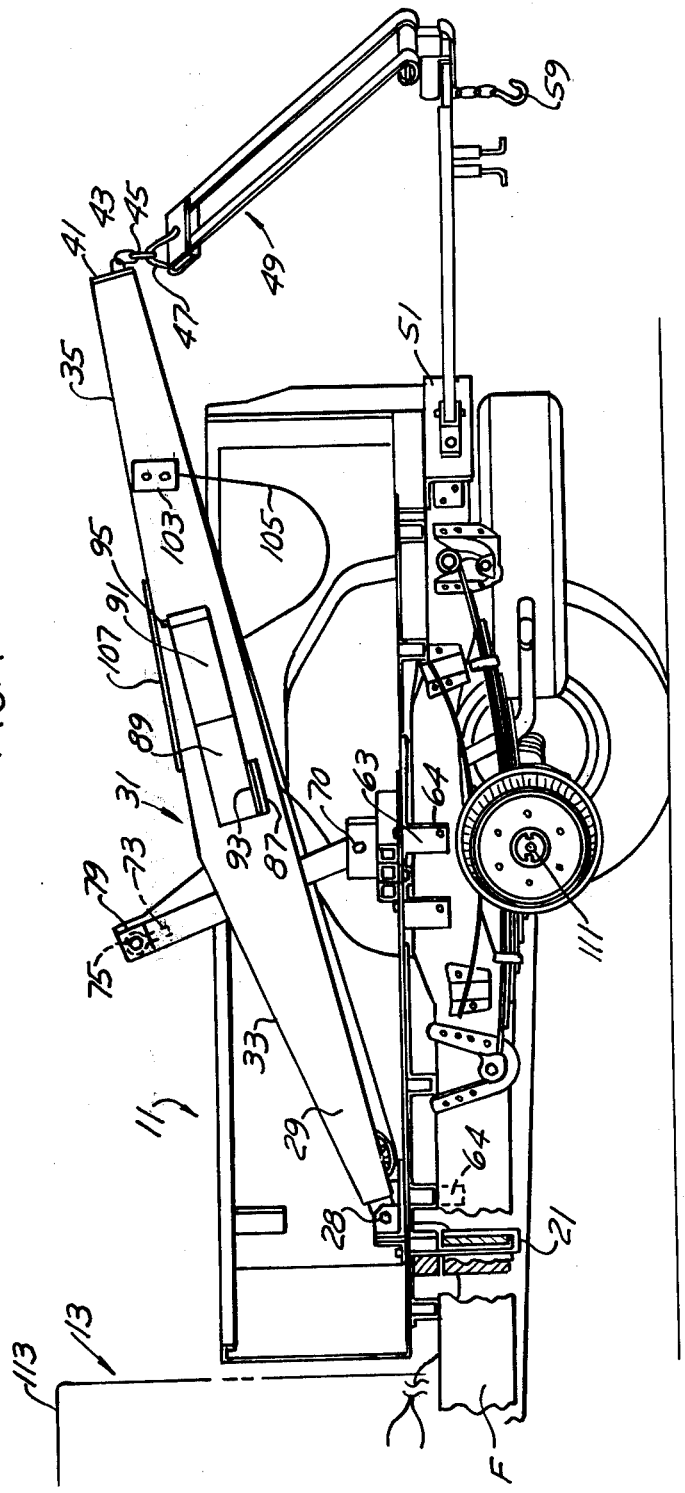
FIG. 1 is a fragmentary broken away side elevational view of the present combination pick up truck and wrecker assembly.

A pair of laterally spaced angle brackets 19 are mounted upon floor 15 adjacent the cab 13 and are secured in place by the U bolts 21 which extend around and are affixed to the frame F, FIG. 1.

SUB-FRAME ASSEMBLY

A sub-frame assembly is the foundation of the complete wrecker assembly.

The sub-frame includes an elongated transversely extending boom-mounting angle 23 which is mounted upon the floor and at its ends, secured to the angle brackets adjacent said cab. Spaced pairs of apertured support ears 25, FIG. 3, are secured to end portions of the mounting angle and project rearwardly thereof and are adapted to cooperatively receive the bottom apertured ears 27 at the ends of the forwardly diverging boom side plates 29 of the boom assembly 31. Ears 27 of the boom are interconnected with the pairs of spaced ears 25 by the transverse bolts 28.

As hereafter described in further detail, the sub-assembly includes the rearwardly extending spacers 61 and across the ends thereof and suitably secured thereto the pairs of engaging transverse tubular supports 65.

Brackets 19, FIG. 2, are initially secured to mounting angle 23, and thus are part of the sub-frame assembly.

The respective boom side plates 29 have towards their forward ends the upwardly tapered top walls 33, and towards their rear ends, the downwardly tapered top walls 35, FIG. 3.

The respective rearward ends of the boom side plates receive therebetween the boom reinforcing tube 37 which is fixedly secured to said side plates by the transverse bracket plate 39, FIG. 3. The forward end of the boom has secured thereto the apertured boom cap 41. Boom chain 43 projects through said cap and terminates at one end in the hammer lock or clasp 45. The inner end of said chain is adjustably anchored within the boom tube by a plurality of bolts upon the interior of tube 37.

As shown in FIGS. 1 and 2, the conventional sling 49 is suspended from the end of the boom 31 by chain 43. The upper central portion of the sling mounts a loop or shackle 47 which is supportably received by the chain hammer lock 45.

Transversely mounted upon end portions of the vehicle frame, rearwardly of the truck floor 15 is the elongated back plate 51 which is suitably bracketed onto the frame and fixedly secured thereto.

A pair of laterally spaced swivels 53 are affixed to back plate 51 to provide universal mountings for the opposed rearwardly converging sling side tubes 55. The adjustable extension rods 56 therein are pivotally connected at 57 to the scoop or support assembly 109 at the bottom of said sling.

The extension rods 56 may be adjustably anchored within the side support tubes 55 by the transverse pins 58 shown in FIG. 2.

Depending from the scoop assembly 109 is a short chain with hook 59 by which, when the sling is not used, it may be reverse-folded and supported with the chain hook engaging the depending hammer lock 45 on the boom chain 43.

The sling, which is a conventional construction, includes a pair of elongated spaced flexible sides which can be reverse-folded and looped to the non-use position above. The universal mounting of the boom support side tubes 55–56 is such that said tubes may be pivoted in a horizontal as well as a vertical plane.

The sub-frame assembly includes the spacer plates 61 which are mounted on floor 15 and connected to end portions of the boom-mounting angle and bolted to frame F, FIG. 1. This securing is effected by anchor brackets 63 connected to end portions of the spacers and secured to the frame F by fasteners 64.

The sub-frame includes at the rear portion thereof a series of parallel-engaging tubular supports 65 which are mounted upon and secured to rear end portions of spacers 61.

Spanning the supports 65 are a pair of upright apertured bottom ears 67 which receive therebetween the sleeve 69 secured upon the lower end of hydraulic cylinder 71 and secured to said ears by pivot pin 70.

The cylinder 71 includes the reciprocal piston and piston rod 73 projecting therefrom and terminating in the transverse top sleeve 75. Said top sleeve is nested within spacer top 77 at the top of the tower mount 80 and is pivotally connected thereto by the transverse pin 79.

The tower mount includes a pair of upwardly converging support plates 81 at their lower ends interconnected by the trasnverse boom support angle 83. The lower ends of the plates 81 engage interior portions of the boom side plates 29. The transverse support plate 83 spans portions of said boom side plates and is suitably secured thereto as by welding.

Accordingly, the tower mount 80, in effect, spans portions of the boom side plates 29 intermediate their ends and extends upwardly thereof functioning further to reinforce the boom side plates and the complete boom assembly. The tower mount includes the transverse cover plate 85 which lies in a plane substantially at right angles to the longitudinal axis of the boom.

POWER PACK ASSEMBLY

Intermediate the ends of the boom 31 and mounted thereon is a power pack assembly which includes as shown in FIGS. 1 and 3 a transverse support plate 87 which spans lower portions of the boom side plates and is suitably secured thereto. Mounted upon plate 87 centrally thereof is the axially extending motor 89, and aligned therewith and connected thereto the hydraulic pump 91 including a fluid reservoir and at the end thereof, a valve including a pair of pressure fluid outlet fittings 95.

Mounting bracket 93 underlying and connected to said motor is secured to plate 87 by a plurality of fasteners.

A pair of flexible conduits 97, FIG. 3, at the one ends are connected to the valve outlet fittings 95 and at their other ends are connected respectively to the longitudinally spaced inlet fittings 99 and 101 adjacent opposite ends of cylinder 71.

ELECTRICAL CIRCUIT

The electrical circuit includes the conventional 12-volt vehicle battery, not shown in the drawing, and the lead wire 105 to the switch 103 mounted on a side portion of the boom as shown in FIG. 1. Said switch has a pair of spaced control buttons, i.e., "a raise" button and a "lower" button connected to suitable solenoid operated valve 96 upon pump 91. Upon activation of the upper button of the switch 103, the valve is so controlled that one of the conduits 97 will direct pressure fluid to the fitting 99 of the cylinder 71 and at the same, energizing the motor 89 so that the pump delivers pressure fluid through the conduit 97 to said cylinder causing an extension of its piston rod 73 and the boom 31 connected thereto for raising the boom. Releasing the upper button will deactivate the motor and pump, leaving the boom in the desired elevated position for a particular lifting and towing job. When it is desired to lower the boom, the lowermost button on the switch 103 is activated which reverses the solenoid valve so that pressure fluid is delivered through the other conduit 97 to the upper fitting 101 of the cylinder, causing a powered lowering of the boom. When manual pressure is removed from the lowermost button, the boom will stop in that lowered position.

The motor 89 is a conventional 12-volt D.C. motor which may be energized directly by the conventional vehicle battery in the electrical circuit.

Accordingly, in certain areas which are confined, such as the interior of the building, the boom may be operated without activating the engine of the pick up truck since, there is sufficient electrical power in the battery to operate the motor and connected pump.

The power pack assembly including the motor 89, pump 91 and its reservoir and solenoid control valve 96 is enclosed by cover plate 107 which overlies the power pack assembly and is secured to the top surface portions 35 of boom side plates 29.

As best shown in FIG. 1, the lower pivot mounting 70 for the hydraulic cylinder is arranged between the cab and axle 111, for increased boom stability.

It is with this construction that with the cylinder assembly 71–73 fully extended, the free upper end of the boom 31 will, nevertheless, be lower than the top 113 of cab 13. This is particularly beneficial when the wrecker assembly is used in confined areas, such as low parking structures and residential garages.

WRECKER ASSEMBLY KIT

The respective elements which make up the wrecker assembly may be packaged as a kit for installation by the individual to his existing pick up truck. The boom 31 as a unit includes tower mount 80 and the power pack assembled thereon, as in FIG. 3. The sub-frame assembly as a unit includes angle plate 23, brackets 19, spacers 61, cylinder supports 65 and ears 67. Once the sub-frame is bolted in place, the boom assembly is pivotally mounted thereon by fasteners 28. The cylinder 71 is interposed between the sub-frame and the boom tower mount, with pins 70 and 79. Conduits 97 are then joined to the valve fittings 95 and the cylinder fittings 99 and 101.

Having described my invention, reference should now be had to the following claims.

I claim:

1. In combination with a pickup truck having a frame, rear axle, battery, a cab and floor with side walls, all mounted upon said frame;
   - a portable wrecker assembly kit for modifying said pickup truck comprising a hollow rectangular sub-frame assembly mounted upon said floor and secured to said frame;
   - a V-shaped in plan boom including a pair of forwardly diverging side plates, at its rear end adapted to lift a load through a conventional sling;
   - first means pivotally mounting the forward ends of said side plates upon said sub-frame adjacent said cab;

said sub-frame including at one end a transverse boom mounting angle plate;

said first means including spaced pairs of apertured ears at the ends of said angle plate, and apertured ears at the forward ends of said side plates pivoted to said first ears respectively;

a tower mounting plate of triangular shape with its base spanning and secured to and reinforcing said boom side plates intermediate their ends;

said tower plate projecting above said side plates in a plane at substantially right angles thereto;

a hollow spacer top upon the upper end of said tower mount plate;

a power cylinder having fittings and including a reciprocal piston rod;

second means pivotally mounting the cylinder at its lower end upon said sub-frame assembly;

said floor having a longitudinal central axis;

said sub-frame assembly including a series of parallel engaging tubular supports extending transversely of said axis, rearwardly of said cab and forwardly of said axle;

said second means including a pair of spaced upstanding ears upon said tubular supports centrally thereof;

a transverse sleeve at the lower end of said cylinder interposed between said ears;

and a pin interconnecting said sleeve and ears on an axis transverse to said longitudinal axis;

third means pivotally mounting the free end of said piston rod upon and within said spacer top;

said third means including a sleeve transversely mounted upon the end of said piston rod and nested within said spacer top;

and a pivot pin extending through said spacer top and said latter sleeve;

a power pack including a motor, pump, valve with an inlet and outlet and a reservoir mounted upon said boom intermediate its ends said power pack lying below the upper surface of said boom and a cover plate connected to the upper surface and spanning said boom side plates and overlying said power pack;

and conduits respectively interconnecting said inlet and outlet with said fittings;

said sub-frame assembly, boom with tower mounting plate, power cylinder, power pack and conduits defining a compact kit adapted for convenient assembly upon the floor of said pickup truck.

2. In the wrecker assembly of claim 1, the mounting of said power pack including a support plate spanning and secured to said boom side plates and spaced rearwardly of said tower plate; said power pack assembly including a bracket on said motor overlying and secured to said support plate.

3. In the wrecker assembly of claim 1, a reinforcing tube interposed between and interconnecting the corresponding rear ends of said boom side plates;

an apertured end cap upon the rear end of and spanning said boom side plates;

and a longitudinally adjustable drawn chain with hook, with said chain anchored within said tube and projecting through said end cap, said hook adapted to support a load lifting sling.

4. In the wrecker assembly of claim 1, said cab having a top, said boom being of such length and so mounted on said sub-frame relative to said cab that with the piston rod fully extended, said boom at its free end is below the cab top, to facilitate movement of the wrecker assembly into confined areas.

* * * * *